(12) United States Patent
Arroyo, Jr. et al.

(10) Patent No.: US 11,861,587 B1
(45) Date of Patent: Jan. 2, 2024

(54) ENCRYPTED MULTI-FACTOR AUTHENTICATION TECHNOLOGIES

(71) Applicant: Stealth Entry LLC, Westerville, OH (US)

(72) Inventors: Israel Arroyo, Jr., Westerville, OH (US); Isaiah Williams, Columbus, OH (US)

( * ) Notice: Subject to any disclaimer, the term of this patent is extended or adjusted under 35 U.S.C. 154(b) by 402 days.

(21) Appl. No.: 16/737,545

(22) Filed: Jan. 8, 2020

Related U.S. Application Data

(60) Provisional application No. 62/789,752, filed on Jan. 8, 2019.

(51) Int. Cl.
| | |
|---|---|
| *G06Q 20/38* | (2012.01) |
| *G06Q 20/32* | (2012.01) |
| *H04L 9/30* | (2006.01) |
| *H04L 9/08* | (2006.01) |
| *H04L 9/32* | (2006.01) |
| *G06Q 20/40* | (2012.01) |
| *G06Q 20/06* | (2012.01) |
| *G06Q 20/36* | (2012.01) |

(52) U.S. Cl.
CPC ....... *G06Q 20/3226* (2013.01); *G06Q 20/326* (2020.05); *G06Q 20/3278* (2013.01); *G06Q 20/3827* (2013.01); *G06Q 20/3829* (2013.01); *G06Q 20/401* (2013.01); *H04L 9/0894* (2013.01); *H04L 9/3073* (2013.01); *H04L 9/3242* (2013.01); *G06Q 20/0655* (2013.01); *G06Q 20/3674* (2013.01); *G06Q 2220/00* (2013.01)

(58) Field of Classification Search
CPC .................................................. G06Q 20/3226
USPC .......................................................... 705/71
See application file for complete search history.

(56) References Cited

U.S. PATENT DOCUMENTS

2019/0361917 A1* 11/2019 Tran ..................... H04W 12/108
2021/0295305 A1* 9/2021 Sheets .................. G06Q 20/326

* cited by examiner

Primary Examiner — Chinedu C Agwumezie
(74) Attorney, Agent, or Firm — Robert R. Lech; Lech Law, LLC

(57) ABSTRACT

Technologies for securely processing payment transactions include a mobile device configured to generate a secure payment transaction request message for a payment transaction. The request message includes a public key address derived from a public key of a public/private key pair. A multi-factor device receives the request message and generates a reference public key address as a function of the corresponding private key of the public/private key pair. The multi-factor device determines whether the public key address included in the received request message matches the generated reference public key address. The multi-factor device generates and transmits a response message to the mobile device including status indicator data based on the determination whether the received public key address matches the generated reference public key address. The mobile device processes or blocks the payment transaction as a function of the status indictor data. Other embodiments are described and claimed.

15 Claims, 14 Drawing Sheets

ENCRYPTED MULTI-FACTOR AUTHENTICATION TECHNOLOGIES

CROSS REFERENCE TO RELATED APPLICATION

This application claims the benefit of U.S. Provisional Patent Application No. 62/789,752, filed on Jan. 8, 2019, the disclosure of which is hereby incorporated herein by reference in its entirety.

TECHNICAL FIELD

Embodiments of the technologies described herein relate, in general, technologies secure payment and transaction technologies. More particularly, the technologies described herein relate to a multi-factor authentication device and a computing device that cooperate to provide secure encrypted payments and transactions.

BACKGROUND

Consumers and service providers are often burdened by credit card fraud and/or theft due to the increase prevalence of skimmers, chip readers, proximity skimmers and other forms of CCV chip hi-jacking or magnetic strip duplication. Additionally, cryptocurrency keys and credit card data are often stored in plain text on mobile devices leading to an increased risk of theft. Thus, a need exists for technologies that protect such data with multiple layers of security.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
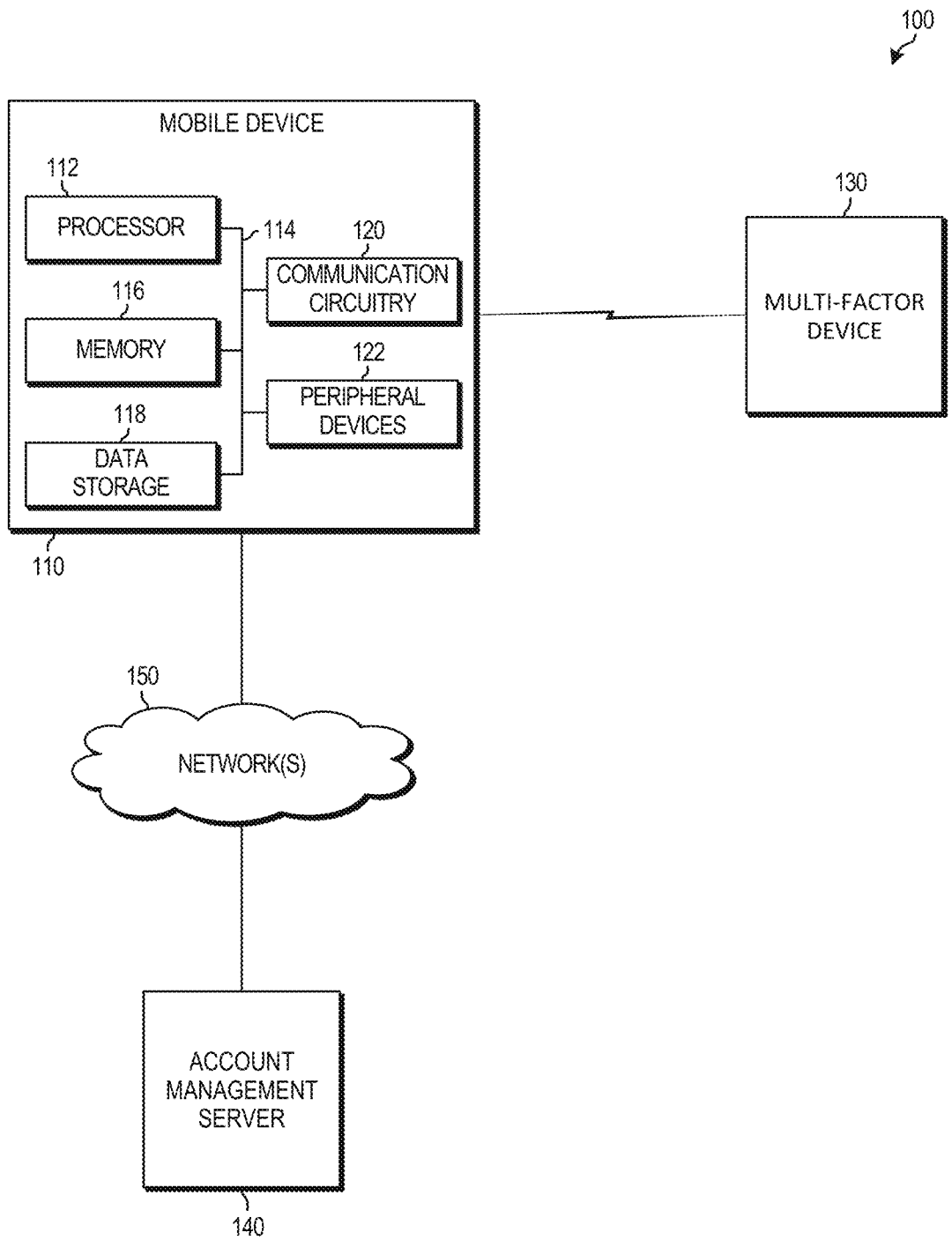
FIG. 1 is an illustrative diagram of at least one embodiment of a multi-factor authentication system.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware.

The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Referring now to FIG. 1, in one embodiment, a system 100 for secure payment and secure transaction processing includes a mobile device 110 and a multi-factor device 130. In some embodiments, such as the one shown in FIG. 1, the system 100 also includes an account management server 140 and/or one or more networks 150. The multi-factor authentication device 130 is in communication with the mobile device 110. In the illustrative embodiment, the multi-factor authentication device 130 is in communication via a BLUETOOTH communications link. It should be appreciated, however, that the multi-factor authentication device 130 may also be in communication with the mobile device 110 via any other wireless (or wired) communication technologies (e.g., Wi-Fi®, NFC, USB, Ethernet, etc.).

The mobile device 110 can be embodied as any type of computing device or server capable of processing, communicating, storing, maintaining, and transferring data. For example, the mobile device 110 can be embodied as a microcomputer, a minicomputer, a custom chip, an embedded processing device, a mobile computing device, a handheld computer, a smart phone, a tablet computer, a personal digital assistant, a laptop computer, a desktop computer, and/or other computing device or suitable programmable device. In some embodiments, the mobile device 110 can be embodied as a computing device integrated with other systems or subsystems. As illustratively shown in FIG. 1, the mobile device 110 includes a processor 112, a system bus 114, a memory 116, a data storage 118, communication circuitry 120, and one or more peripheral devices 122. Of course, the mobile device 110 can include other or additional components, such as those commonly found in a computing device and/or server (e.g., various input/output devices), in other embodiments. Additionally, in some embodiments, one or more of the illustrative components can be incorporated in, or otherwise from a portion of, another component. For example, the memory 116, or portions thereof, can be incorporated in the processor 112 in some embodiments. Furthermore, it should be appreciated that the mobile device 110 can include other components, sub-components, and devices commonly found in a computer and/or computing device, which are not illustrated in FIG. 1 for clarity of the description.

The processor 112 can be embodied as any type of processor capable of performing the functions described herein. For example, the processor 112 can be embodied as a single or multi-core processor, a digital signal processor, a microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or any other type of processor or processing/controlling circuit or controller.

In various configurations, the mobile device 110 includes a system bus 114 for interconnecting the various components of the mobile device 110. The system bus 114 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 112, the memory 116, and other components of the mobile device 110. In some embodiments, the mobile device 110 can be integrated into one or more chips such as a programmable logic device or an application specific integrated circuit (ASIC). In such embodiments, the system bus 114 can form a portion of a system-on-a-chip (SoC) and be incorporated, along with the processor 112, the memory 116, and other components of the mobile device 110, on a single integrated circuit chip.

The memory 116 can be embodied as any type of volatile or non-volatile memory or data storage capable of performing the functions described herein. For example, the memory 116 can be embodied as read only memory (ROM), random access memory (RAM), cache memory associated with the processor 112, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 116 can store various data and software used during operation of the mobile device 110 such as operating systems, applications, programs, libraries, and drivers.

The data storage 118 can be embodied as any type of device or devices configured for short-term or long-term storage of data such as, for example, memory devices and circuits, memory cards, hard disk drives, solid-state drives, or other data storage devices. For example, in some embodiments, the data storage 118 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 112, or the memory 116 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 120 of the mobile device 110 may be embodied as any type of communication circuit, device, interface, or collection thereof, capable of enabling communications between the mobile device 110 and the multi-factor device 130, the account management server 140 and/or any other computing or processing devices communicatively coupled thereto. For example, the communication circuitry 120 may be embodied as one or more network interface controllers (NICs), in some embodiments. The communication circuitry 120 may be configured to use any one or more communication technologies (e.g., wireless or wired communications) and associated protocols (e.g., Ethernet, Wi-Fi®, WiMAX, etc.) to effect such communication. In the illustrative embodiment, the communication circuitry 120 includes a wireless communication interface (e.g., Wi-Fi®, Bluetooth®, NFC, mesh network, etc.) configured to enable communications between the mobile device 110 and the multi-factor device 130, the account management server 140, and/or any other computing or processing device. Additionally or alternatively, in some embodiments, the communication circuitry 120 includes a wired communication interface (e.g., Ethernet, coaxial communication interface, USB, serial communication interface, parallel communication interface, etc.) configured to enable communications directly between the mobile device 110 and the multi-factor device 130 and/or the account management server 140 via a physical communications connection.

In some embodiments, the mobile device 110, the multi-factor device 130, the account management server 140, and/or any other computing or processing devices of the system 100, can communicate with each other over one or more networks 150. The network(s) 150 can be embodied as any number of various wired and/or wireless communication networks. For example, the network(s) 150 can be embodied as or otherwise include a local area network (LAN), a wide area network (WAN), a cellular network, or a publicly-accessible, global network such as the Internet. Additionally, the network(s) 150 can include any number of additional devices to facilitate communication between the computing devices of the system 100.

Additionally, in some embodiments, the mobile device 110 can further include one or more peripheral devices 122. Such peripheral devices 122 can include any type of peripheral device commonly found in a computing device such as various user interface devices (e.g., a joystick, buttons, controls, a hardware keyboard, a keypad, a gesture or graphical input device, a motion input device, a vibratory device, a computer mouse, a voice recognition unit, etc.), a display and/or a touchscreen interface, additional data storage, speakers, an audio unit, a peripheral communication device, and any other suitable user interface, input/output device, and/or other peripheral device.

Figure 2A:
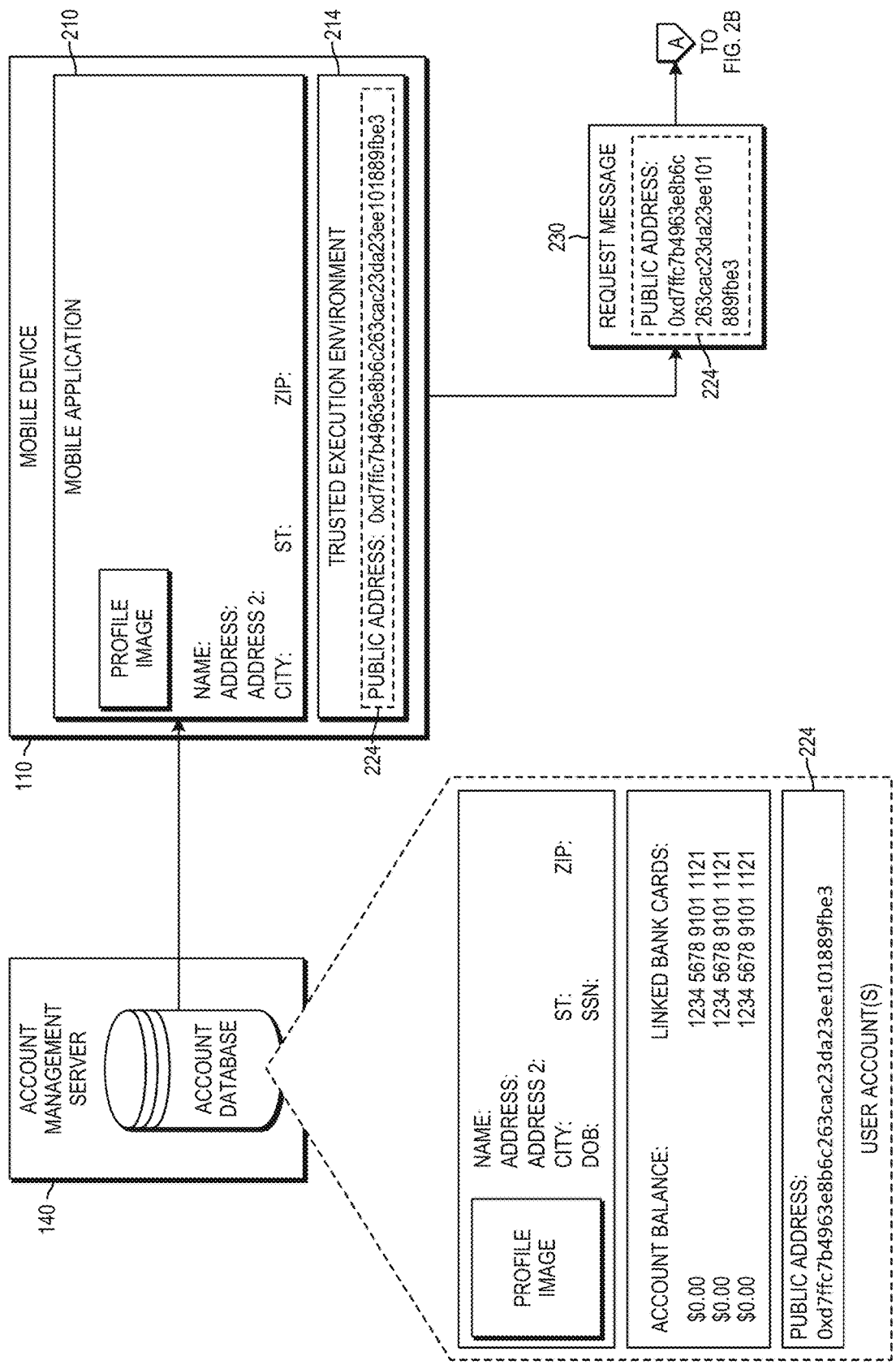
FIGS. 2A-2C depict a simplified system processing flow diagram of an embodiment for one-tap secure payment processing that may be performed using the system of FIG. 1.
Figure 2B:
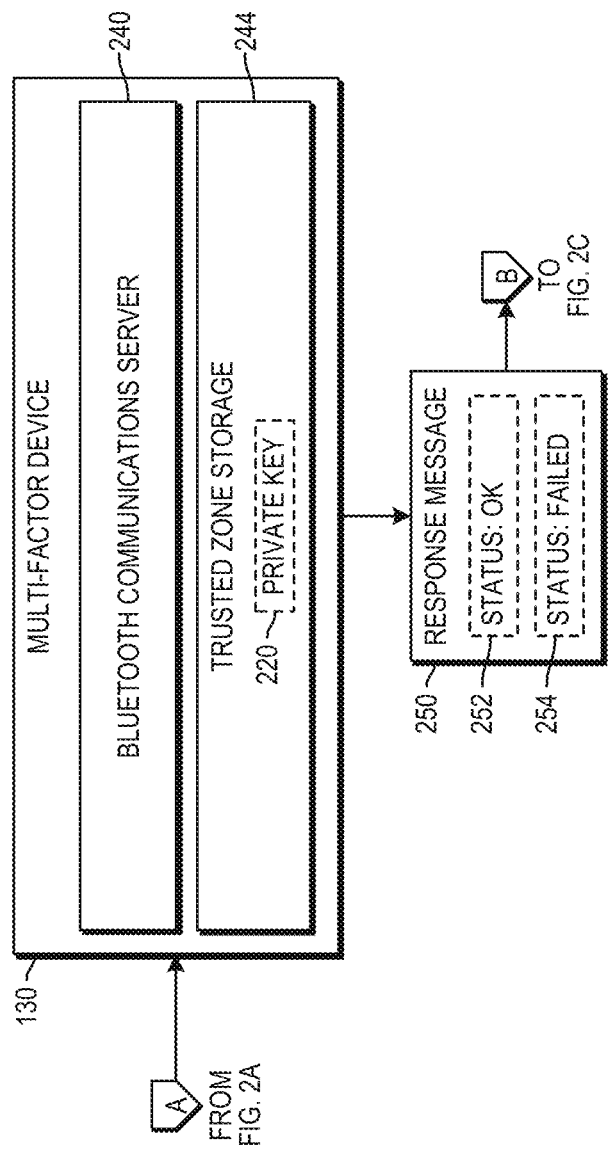
Figure 2C:
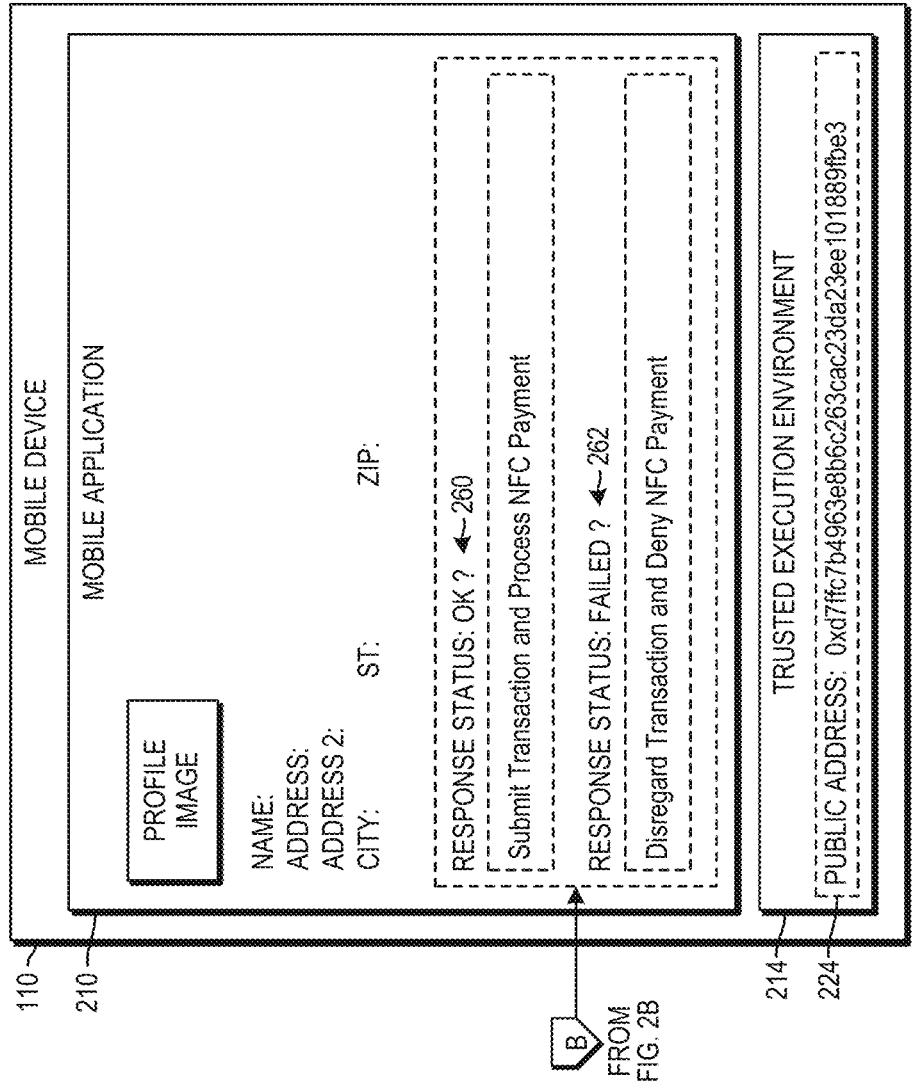
Figure 3:
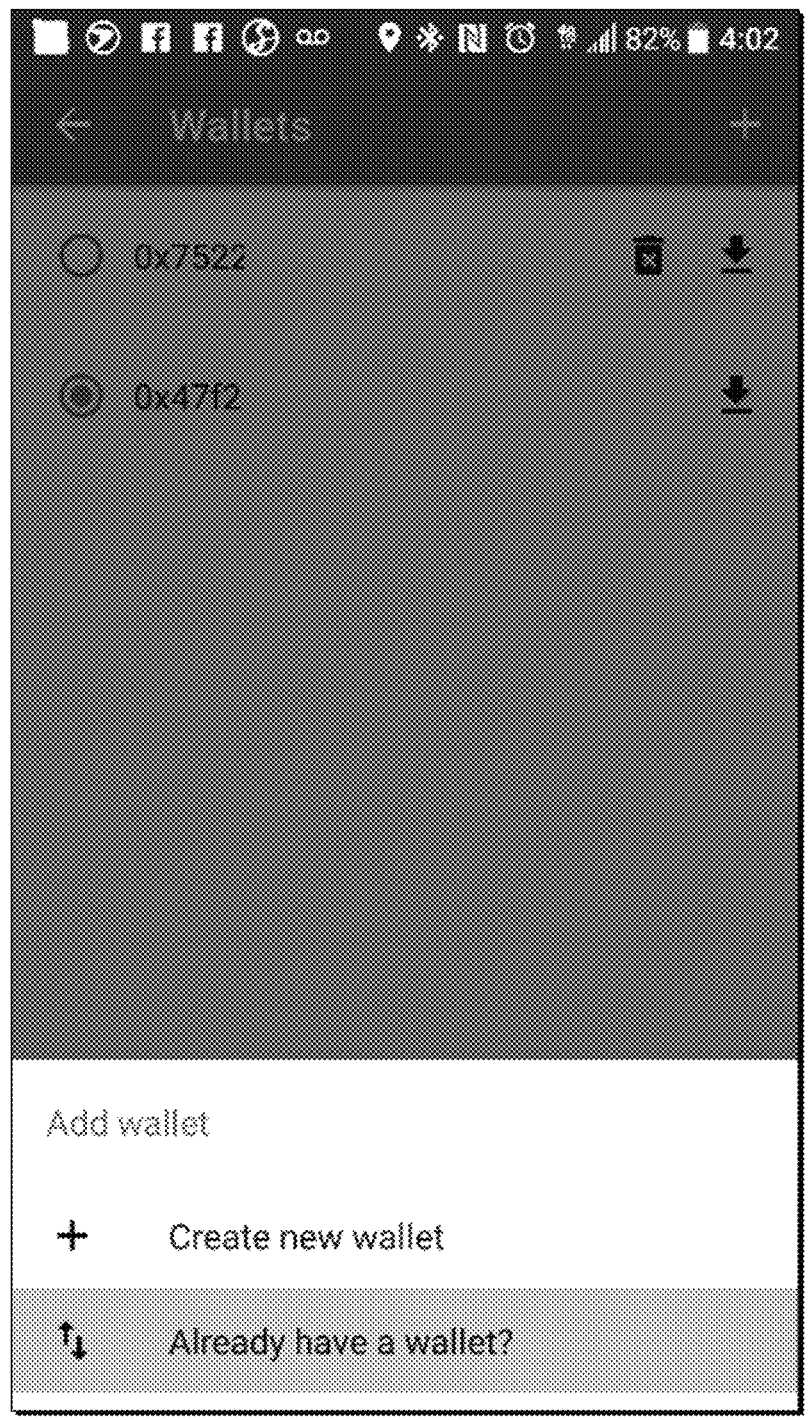
FIGS. 3-11 are illustrative user interfaces depicting various aspects of a software wallet that may be executed by the mobile device of FIG. 1.
Figure 4:
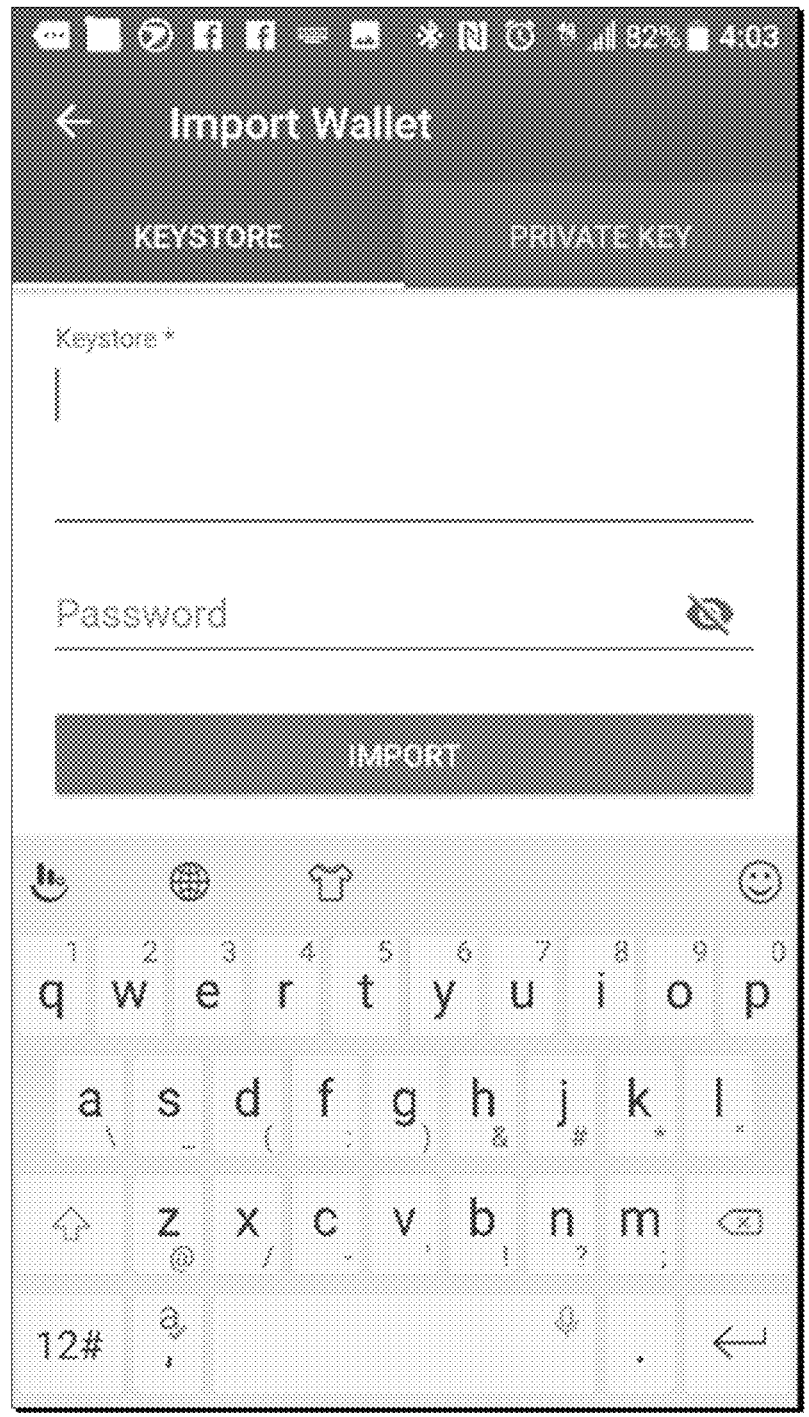
Figure 5:
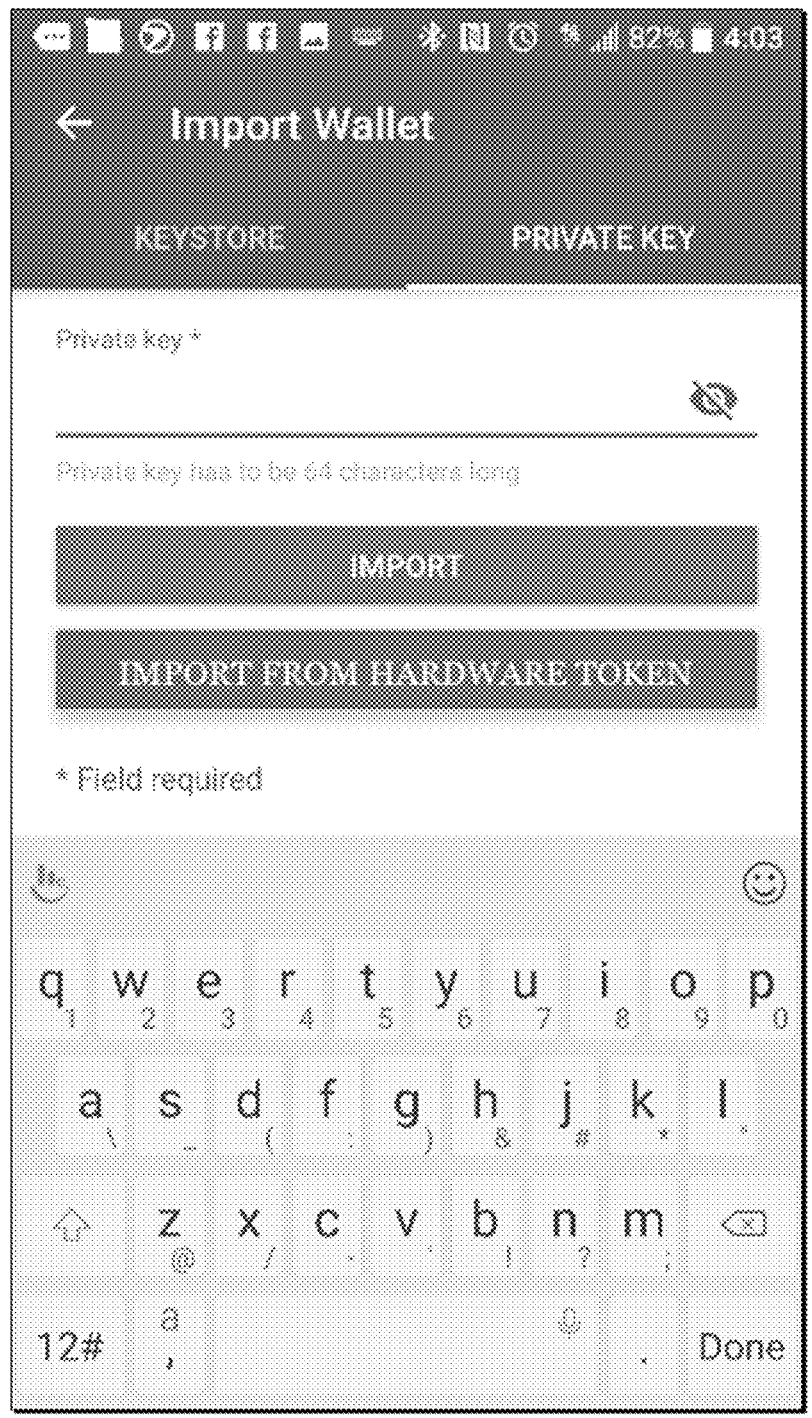
Figure 6:
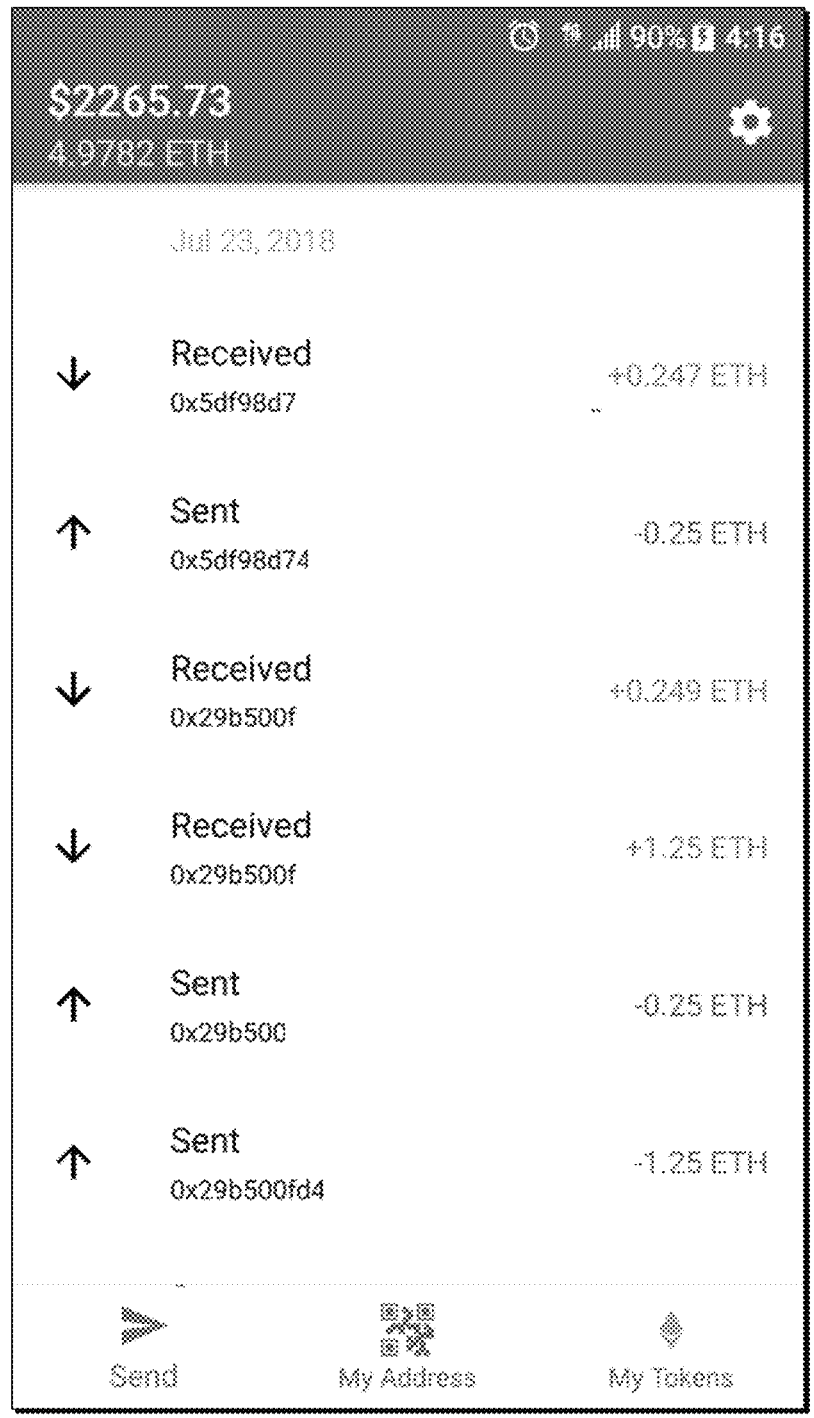
Figure 7:
Figure 8:
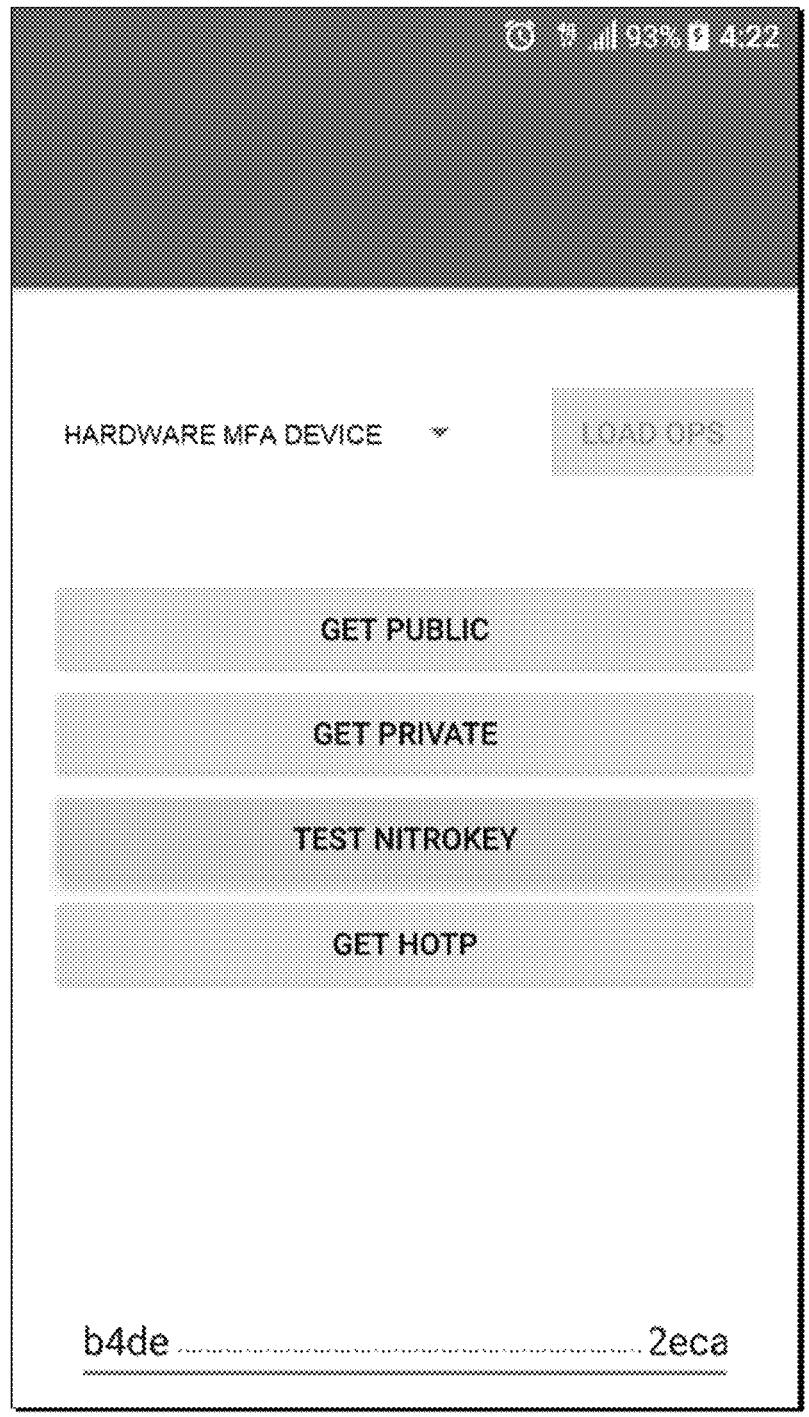
Figure 9:
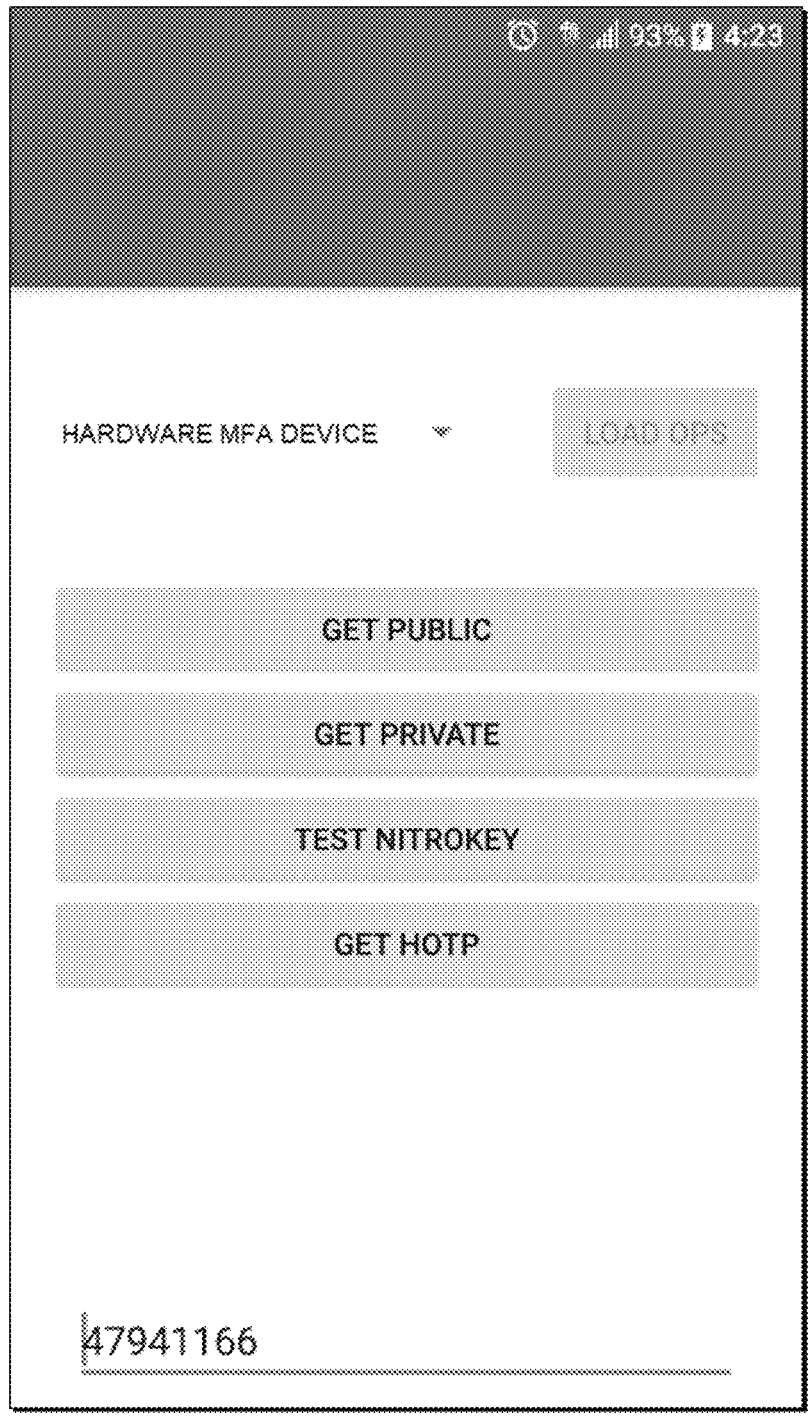
Figure 10:
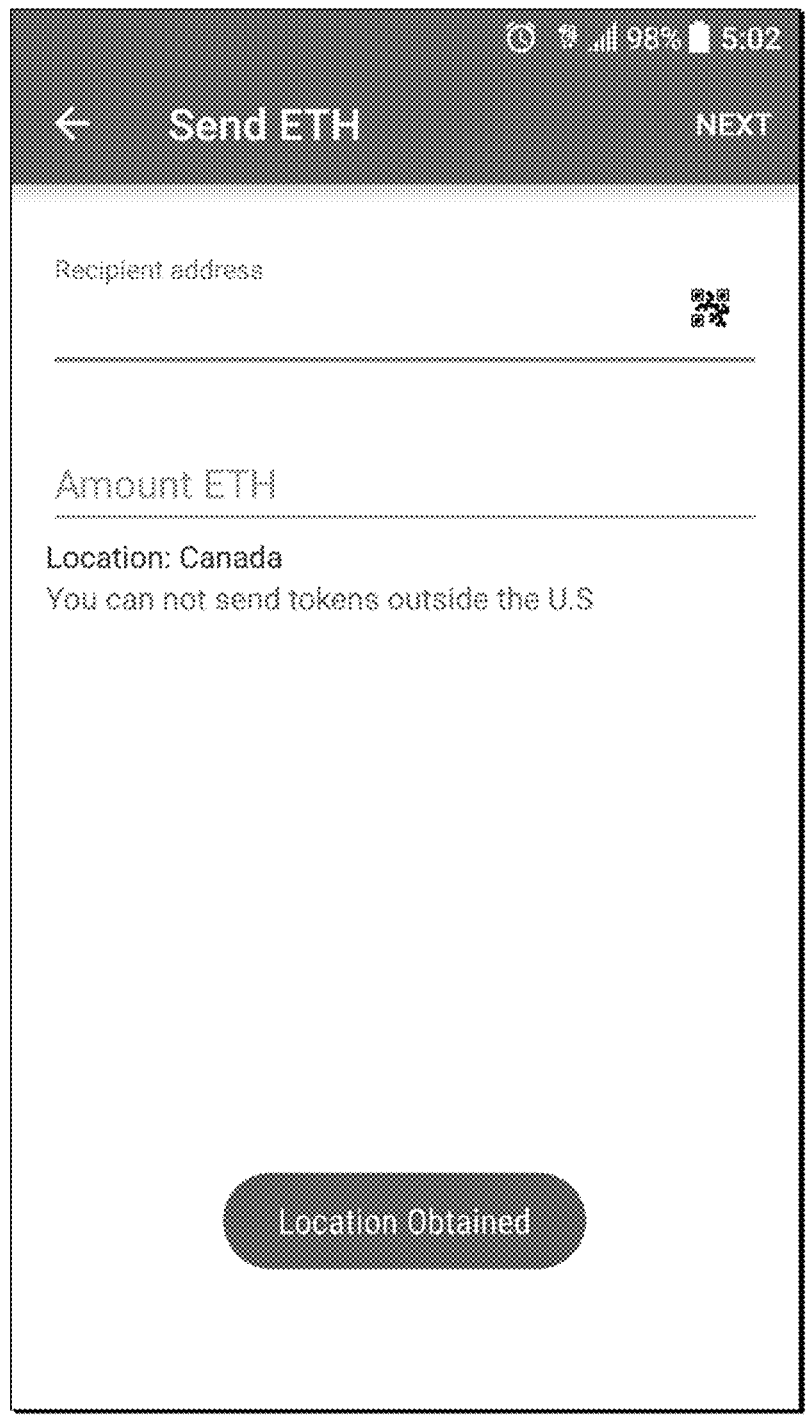
Figure 11:
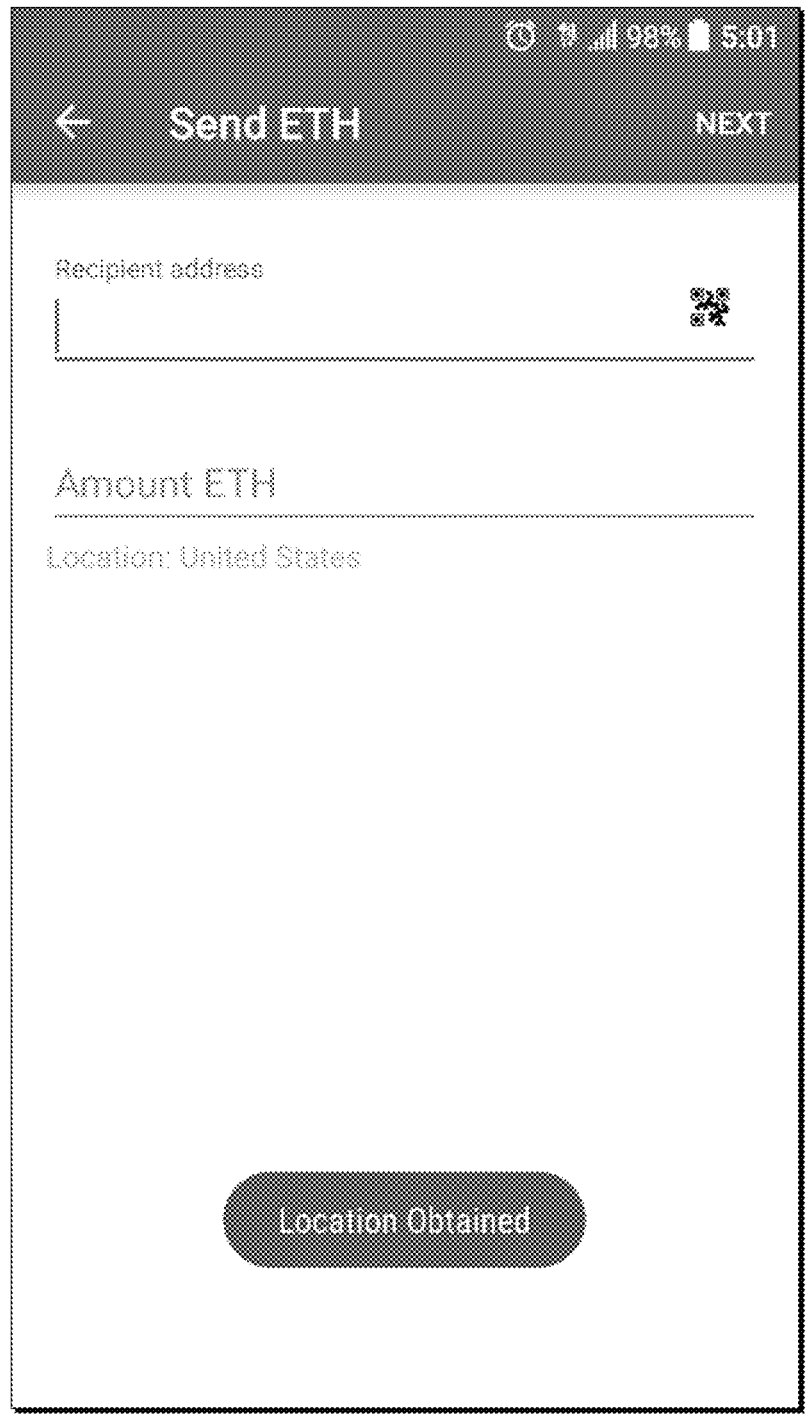

In some embodiments, such as the one shown in FIGS. 2A-2C, the mobile device 110 may be configured to execute a mobile application 210 (e.g., a payment processing application, digital wallet, etc.). As described herein, the mobile application 210 may be configured to facilitate secure transactions (e.g., one-tap payment transactions, cryptocurrency transactions, etc.) made via the mobile device 110. The mobile device 110 may also execute a trusted execution environment 214 (e.g., OP-TEE, etc.), which may be used to store a public key address 224 (e.g., a blockchain address, etc.), in some embodiments.

Referring back to FIG. 1, the multi-factor device 130 may be embodied as any type of computing device capable of performing the functions described herein. As such, the multi-factor device 130 may include devices and structures commonly found in computing devices such as processors, memory devices, communication circuitry, and data storages, which are not shown in FIG. 1 for clarity of the description. In some embodiments, the multi-factor device 130 may execute a Linux distribution and a trusted execution environment (e.g., OP-TEE, etc.), which may include trusted zone storage 244. The trusted zone storage 244 may be configured to store a private key 220 of a corresponding public/private key pair. In some embodiments, the private key 220 stored in the trusted zone storage 244 may be embodied as a private blockchain key. As described in more detail below in connection with FIGS. 2A-2C, the multi-factor device 130 may also be configured to execute or otherwise function as a Bluetooth® communications server 240. In such embodiments, the Bluetooth® communications server 240 of the multi-factor device 130 may be configured to handle requests received from the mobile device 110. The multi-factor device 130 may also be configured to provide cryptographic processing for public key infrastructures.

The account management server 140 may be embodied as any type of computing device (or devices) capable of performing the functions described herein. As such, the account management server 140 may include devices and structures commonly found in computing devices such as processors, memory devices, communication circuitry, and data storages, which are not shown in FIG. 1 for clarity of the description. In some embodiments, the account management server 140 is configured to provide user account information (e.g., bibliographic data, account data, credit/bank card numbers, public key address, etc.) to a mobile application (e.g., the mobile application 210 of FIG. 2A) executed by the mobile device 110. Such account information may be stored in a local database or may be retrieved from a remote storage device or service (e.g., remote storage server, remote database, cloud storage service, etc.) by the account management server 140. In some embodiments, the account management server 140 may be configured to provide a hosted website that acts as an account management portal similar to banking websites in which users can be registered and provided with various account management features.

Referring now to FIGS. 2A-2C, a simplified system processing flow diagram of secure payment processing that may be performed by the mobile device 110 and the multi-factor device 130 is depicted. As discussed, the mobile device 110 may execute a mobile payment application 210. The mobile application 210 may be configured to include user account information (e.g., user credentials, bibliographic data, account data, credit/bank card numbers, etc.) and a public key address 224, which may be retrieved from the account management server 140 (or any other source). In some embodiments, the mobile application 210 may also be configured to include multiple public key addresses 224. It should be appreciated that in the illustrative secure payment processing technologies depicted in FIGS. 2A-2C, the private key corresponding or otherwise relating to the public key address 224 is not used for verification. Instead, for increased security, the corresponding/related private key stored in the trusted zone storage 244 of the multi-factor device 130 is processed via cryptographic functions to rederive or regenerate the public key address, as discussed in more detail herein. Such functionality is beneficial because the private key is kept separate from the public key. That is, the public key and the private key do not reside on the same mobile device 110, e.g., the private key does not leave the encrypted trusted zone storage 244 of the multi-factor device 130.

As discussed, the mobile application 210 of the mobile device 110 may retrieve the user account information and the public key address 224 from the account management server 140 (or another source), in some embodiments. For example, in some embodiments, when a user is registered they will be assigned a public key address 224 to their account. The public key address 224 may be derived from a public key of a public/private key pair. For example, in some embodiments, the public key address may be a hash of a public key derived from a private key. As discussed herein, the private key 220 used to generate the public key, which is subsequently used to derive the public key address 224, may be stored in the trusted zone storage 244 of the multi-factor device 130. Once the private key 220 has been securely stored in the trusted zone storage 244 of the multi-factor device 130, the multi-factor device 130 can be shipped to the registered user via hardware supply chain (or other secure means). In some embodiments, once the user receives the multi-factor device 130, the user may complete a verification process via the mobile application 210 to ensure that the multi-factor device 130 is successfully registered to the mobile application 210 and user information is correct on both the multi-factor device 130 and the mobile application 210. It should be appreciated that such process increases security as the private key 220 is not transmitted outside the trusted zone storage 244 of the multi-factor device 130.

In operation, during a secure payment transaction, the mobile application 210 of the mobile device 110 is configured to generate a request message 230, in some embodiments. In such embodiments, the request message 230 may include the public key address 224 and may be transmitted to the multi-factor device 130 via a Bluetooth® communications link. The Bluetooth® communications server 240 of the multi-factor device 130 may be configured to receive the request message 230 from the mobile device 110 and, based at least in part on the content of that request message 230, respond accordingly. For example, the multi-factor device 130 may be configured to rederive or regenerate the public key address and compare that rederived/regenerated public key address to the public key address 224 included in the request message 230 received from the mobile device 110. Based at least in part on the outcome of the comparison, the multi-factor device 130 may be configured to generate a response message 250, which is transmitted to the mobile device 110 via Bluetooth® (or other communication technology). For example, if the rederived/regenerated public key address matches the public key address 224 included in the request message 230, the multi-factor device 130 may be configured to generate a response message 250 indicating a status of "OK" (e.g., see 252 of FIG. 2B). If, however, the rederived/regenerated public key address does not match the public key address 224 included in the request message 230, the multi-factor device 130 may be configured to instead generate a response message 250 indicating a status of "FAILED" (e.g., see 254 of FIG. 2B).

Upon receipt of the response message 250, the mobile application 210 of the mobile device 110 may be configured determine whether to allow or deny a payment transaction based at least in part on, or otherwise as a function of, the response message 250 received from the multi-factor device 130. For example, as illustratively shown in FIG. 2C, the mobile application 210 may be configured to determine whether the response message 250 indicates a status of "OK" (e.g., determination flow 260) or a status of "FAILED" (e.g., determination flow 262). Continuing this example, if the mobile application 210 determines that the response message 250 indicates a status of "OK," the mobile application 210 may be configured to submit the transaction and process the NFC payment accordingly. If, however, the mobile application 210 instead determines that the response message indicates a status of "FAILED," the mobile application 210 may be configured to disregard the transaction and deny the NFC payment. In this way, the multi-factor device 130 is configured to act as an interrupt in NFC one-tap payment processes made via the mobile device 110. In doing so, a payment application (e.g., the mobile application 210 of FIG. 2A) of the mobile device 110 may be configured to deny payment authorization if the multi-factor device 130 is not present and connected to the mobile device 110. Conversely, the payment application of the mobile device 110 may be configured to allow payment authorization if the multi-factor device 130 is present and connected to the mobile device 110.

In some embodiments, the mobile device 110 (e.g., the mobile application 210 or other components of the mobile device 110), the multi-factor device 130, and/or any other components or devices of the system 100 may be configured to utilize the PKI infrastructure to encrypt/decrypt communications. For example, in some embodiments, the mobile application 210/mobile device 110 may be configured to encrypt messages (e.g., the request message 230 or any other type of message) sent to the multi-factor device 130 with a public key corresponding to the private key stored in the trusted zone storage 244 of the multi-factor device 130. Upon receipt, the multi-factor device 130 may use the corresponding private key to decrypt the message received from the mobile application 210/mobile device 110. Additionally, in such embodiments, the multi-factor device 130 can be configured to encrypt messages (e.g., the response message 250 or any other type of message) sent to the mobile application 210/mobile device 110 with the private key. Upon receipt, the mobile application 210/mobile device 110 may use the corresponding public key to decrypt the message received from the multi-factor device 130. Additionally or alternatively, the mobile device 110 (e.g., the mobile application 210 or other components of the mobile device 110), the multi-factor device, and/or any other components or devices of the system 100 may be configured to utilize symmetric encryption in addition to the PKI infrastructure to encrypt/decrypt communications. For example, in some embodiments, the mobile application 210/mobile device 110 can be configured to generate a symmetric encryption key for each transaction (e.g., a session key). In such cases, the mobile application 210/mobile device 110 can be configured to encrypt the generated symmetric encryption key with the public key corresponding to the private key stored in the trusted zone storage 244 of the multi-factor device 130. Upon receipt of the encrypted symmetric encryption key, the multi-factor device 130 can use the corresponding private key to decrypt the encrypted symmetric encryption key. Thereafter, both the multi-factor device 130 and the mobile application 210/mobile device 110 can utilize the unencrypted symmetric key to encrypt and decrypt communications (e.g., the request message 230, the response message 250, or any other type of message or data) sent by or sent to the other device.

Additionally, in some embodiments, the multi-factor device 130 can also be configured to generate a one-time password (OTP). In such embodiments, the mobile application 210 can be configured to request and verify the OTP prior to authorizing a one-tap payment NFC transaction. To do so, in some embodiments, the mobile application 210 can be configured to locally generate the OTP. Thereafter, the mobile application 210 can be configured to compare the locally-generated OTP with the OTP generated by the multi-factor device 130. If the locally-generated OTP matches the OTP generated by the multi-factor device 130, the mobile application 210 may be configured to submit the transaction and process the NFC payment. If, however, the locally-generated OTP does not match the OTP generated by the multi-factor device 130, the mobile application 210 may instead be configured to disregard the transaction and prevent the NFC payment. Additionally or alternatively, the multi-factor device 130 may be configured to generate location data, which can be passed to the mobile application 210 in order to verify the location in which the payment is being made. In such embodiments, transactions may be permitted only in certain geographic locations.

Figure 12:
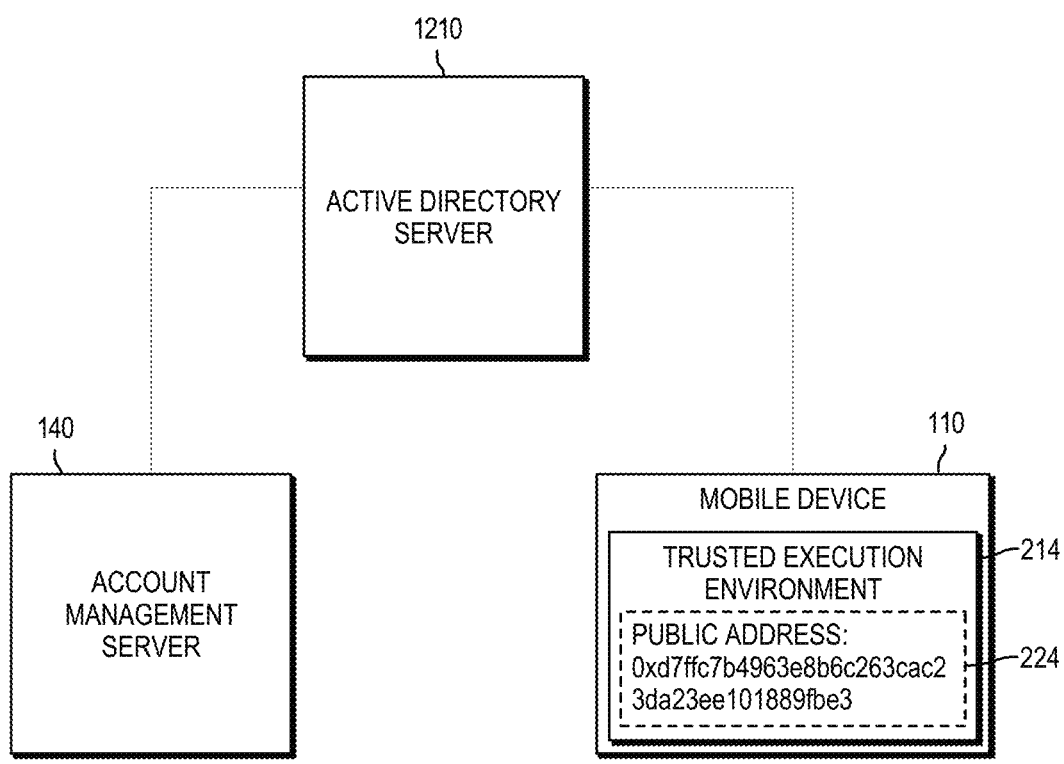
FIG. 12 is an illustrative diagram of at least one embodiment of the multi-factor authentication system of FIG. 1 configured to provide single sign-on functionality.

The multi-factor authentication system 100 can also be used to provide single sign-on functionality, in some embodiments. More specifically, components of the system 100 can be used to facilitate user account generation for accessing one or more electronic services. For example, in some embodiments, such as the one illustratively shown in FIG. 12, a user may be registered via the Account Management Server 140. During registration, a user account may be generated within a directory service. In the illustrative embodiment, the directory service may be provided by a separate active directory server 1210. In other embodiments, the directory server may executed by the account management server 140 or another computing device of the system 100.

The user account generated in the directory service (e.g., the active directory server 1210) may include the user's public address 224 as the user's principal name (e.g., username, unique identifier, etc.). Additionally, in some embodiments, additional metadata associated with the user (e.g., email address, postal address, phone number, personally identifiable information, etc.) may also be used to populate additional information fields of the newly generated user account. It should be appreciated that generating a user account including the user's public address 224 as the user's principal name facilitates provision of single sign-on capabilities to the user and compliance with "Know Your Customer" regulations/guidelines.

Additionally, in some embodiments, the multi-factor authentication system 100 system 100 can be used in connection with various blockchain technologies. For example, in some embodiments, the system 100 may include one or more validator devices (e.g., nodes) of a validation network (e.g., multiple nodes) configured to communicate with each over via one or more networks. Additionally, in such embodiments, a cryptocurrency unit associated one or more electronic services, access portals, or smart contracts may be transferred from one party (e.g., an access provider, a municipality, a service provider, etc.) to a digital wallet or user account of a user (e.g., a resident, a subscriber, am acquiring user, etc.). The transfer of the cryptocurrency unit from the original entity to the digital wallet of the user may be validated via a cryptocurrency ledger (e.g., a block chain, etc.) to ensure that the user is permitted to access a particular service or agreed to a particular term.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method of securely processing payment transactions, the method comprising:
   retrieving, by a mobile application executed by a mobile device, user account information and a public key address associated with a user from an account management server, the public key address being derived from a public key of a public/private key pair associated with the user and stored in a trusted execution environment of the mobile device, wherein the public key address comprises a blockchain address;
   generating, by the mobile application, a secure payment transaction request message for a requested payment transaction comprising an amount of cryptocurrency, the secure payment transaction request message comprises the public key address;
   transmitting, by the mobile application, the secure payment transaction request message to a multi-factor device;
   receiving, by the multi-factor device, the secure payment transaction request message, the multi-factor device comprises a trusted zone storage and a private key of the public/private key pair stored in the trusted zone storage, wherein the private key is mathematically related to the public key of the public/private key pair, wherein the private key comprises a blockchain key;
   generating, by the multi-factor device, a reference public key address as a function of the private key stored in the trusted zone storage;
   determining, by the multi-factor device, whether the public key address comprised in the secure payment transaction request message received from the mobile application matches the generated reference public key address;
   generating, by the multi-factor device, a response message based at least in part on determining whether the public key address comprised in the secure payment transaction request message received from the mobile application matches the generated reference public key address, wherein the response message comprises one of (i) positive status indicator data in response to a determination by the multi-factor device that the public key address comprised in the secure payment transaction request message received from the mobile application matches the generated reference public key address, or (ii) negative status indicator data in response to a determination by the multi-factor device that the public key address comprised in the secure payment transaction request message received from the mobile application does not match the generated reference public key address;
   transmitting, by the multi-factor device, the response message to the mobile device;
   processing, by the mobile device, the requested payment transaction in response to a determination that the response message received from the multi-factor device comprises the positive status indicator data, the processing comprising initiating a transfer of the amount of cryptocurrency; and blocking, by the mobile application, the requested payment transaction in response to a determination that the response message received from the multi-factor device comprises the negative status indicator data.

2. The method of claim 1, wherein generating the reference public key address comprises (i) generating, by the multi-factor device, a reference public key as a function of the private key stored in the trusted zone storage; and (ii) generating, by the multi-factor device, the reference public key address as a function of the generated reference public key.

3. The method of claim 2, wherein the public key address retrieved from the account management server and stored in the trusted execution environment of the mobile device is a hash of the public key of the public/private key pair associated with the user.

4. The method of claim 3, wherein generating the reference public key address as a function of the generated reference public key comprises hashing the generated reference public key.

5. The method of claim 1, wherein the trusted execution environment of the mobile device comprises a first trusted execution environment; and further comprising:
   initializing, by the multi-factor device, a second trusted execution environment, the second trusted execution environment comprises the trusted zone storage; and
   wherein generating the reference public key address comprises generating, by the second trusted execution environment, the reference public key address as a function of the private key stored in the trusted zone storage.

6. The method of claim 5, wherein generating the reference public key address comprises (i) generating, by the second trusted execution environment, a reference public key as a function of the private key stored in the trusted zone storage; and (ii) generating, by the second trusted execution environment, the reference public key address as a function of the generated reference public key.

7. The method of claim 6, wherein the public key address retrieved from the account management server and stored in the first trusted execution environment of the mobile device is a hash of the public key of the public/private key pair associated with the user.

8. The method of claim 7, wherein generating the reference public key address as a function of the generated reference public key comprises hashing, by the second trusted execution environment, the generated reference public key.

9. The method of claim 1, wherein transmitting the response message to the mobile device comprises transmitting the response message to the mobile application of the mobile device;
   wherein processing the requested payment transaction comprises processing, by the mobile application, the requested payment transaction in response to a determination that the response message received from the multi-factor device comprises the positive status indicator data; and
   wherein blocking the requested payment transaction comprises blocking, by the mobile application, the requested payment transaction in response to a determination that the response message received from the multi-factor device comprises the negative status indicator data.

10. The method of claim 9, wherein processing the requested payment transaction comprises allowing, by the mobile application, a contactless payment to be made with the mobile device in response to a determination that the response message received from the multi-factor device comprises the positive status indicator data; and
   wherein blocking the requested payment transaction comprises blocking, by the mobile application, a contactless payment to be made with the mobile device in response to a determination that the response message received from the multi-factor device comprises the negative status indicator data.

11. The method of claim 1, further comprising determining, by the trusted execution environment of the mobile device, whether the response message received from the multi-factor device comprises the positive status indicator data or the negative status indicator data;
   wherein processing the requested payment transaction comprises processing, by the trusted execution environment of the mobile device, the requested payment transaction in response to a determination that the response message received from the multi-factor device comprises the positive status indicator data; and
   wherein blocking the requested payment transaction comprises blocking, by the trusted execution environment of the mobile device, the requested payment transaction in response to a determination that the response message received from the multi-factor device comprises the negative status indicator data.

12. The method of claim 11, wherein processing the requested payment transaction comprises allowing, by the trusted execution environment of the mobile device, a contactless payment to be made with the mobile device in response to a determination that the response message received from the multi-factor device comprises the positive status indicator data; and
   wherein blocking the requested payment transaction comprises blocking, by the trusted execution environment of the mobile device, a contactless payment to be made with the mobile device in response to a determination that the response message received from the multi-factor device comprises the negative status indicator data.

13. The method of claim 1, wherein transmitting the secure payment transaction request message to the multi-factor device comprises transmitting, by the mobile application, the secure payment transaction request message via a short-range wireless communication link established between the mobile device and the multi-factor device; and
   wherein transmitting the response message to the mobile device comprises transmitting, by the multi-factor device, the response message via the short-range wireless communication link established between the mobile device and the multi-factor device.

14. The method of claim 1, wherein transmitting the secure payment transaction request message to the multi-factor device comprises transmitting, by the mobile application, an encrypted secure payment transaction request message to the multi-factor device; and
   wherein transmitting the response message to the mobile device comprises transmitting, by the multi-factor device, an encrypted response message to the mobile device.

15. The method of claim 1, further comprising:
   encrypting, by the mobile application, the secure payment transaction request message as a function of the public key of the public/private key pair prior to transmitting the secure payment transaction request message to the multi-factor device;

decrypting, by the multi-factor device, the encrypted secure payment transaction request message received from the mobile application as a function of the private key of the public/private key pair;

encrypting, by the multi-factor device, the response message as a function of the private key of the public/private key pair prior to transmitting the response message to the mobile device; and decrypting, by the mobile application, the encrypted response message received from the multi-factor device as a function of the public key of the public/private key pair.

\* \* \* \* \*